(12) United States Patent
Minamikawa et al.

(10) Patent No.: US 7,771,552 B2
(45) Date of Patent: Aug. 10, 2010

(54) METHOD FOR MANUFACTURING THIN FILM CAPACITOR

(75) Inventors: Tadahiro Minamikawa, Ritto (JP); Atsuyoshi Maeda, Otsu (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 217 days.

(21) Appl. No.: 11/928,287

(22) Filed: Oct. 30, 2007

(65) Prior Publication Data

US 2008/0060743 A1   Mar. 13, 2008

Related U.S. Application Data

(63) Continuation of application No. PCT/JP2006/308563, filed on Apr. 24, 2006.

(30) Foreign Application Priority Data

May 10, 2005 (JP) ............... 2005-137187
Jul. 15, 2005 (JP) ............... 2005-206942

(51) Int. Cl.
C03B 29/00 (2006.01)
B29C 65/00 (2006.01)
C04B 33/32 (2006.01)

(52) U.S. Cl. ............... 156/89.12; 156/89.16; 264/615; 264/674; 264/676

(58) Field of Classification Search ............... None
See application file for complete search history.

(56) References Cited

U.S. PATENT DOCUMENTS 3,879,509 A * 4/1975 Elderbaum ............ 419/9
5,085,720 A * 2/1992 Mikeska et al. ......... 156/89.14

5,097,391 A * 3/1992 Nomura et al. ......... 361/321.4

(Continued)

FOREIGN PATENT DOCUMENTS

JP    59-50079    3/1984

(Continued)

OTHER PUBLICATIONS

International Search Report PCT/JP2006/308563 dated Jul. 10, 2006.

(Continued)

*Primary Examiner*—Philip C Tucker
*Assistant Examiner*—Alex Efta
(74) *Attorney, Agent, or Firm*—Dickstein, Shapiro, LLP.

(57) ABSTRACT

A dielectric green sheet containing a dielectric ceramic powder, conductor green sheets containing a metal powder, and firing-assisting green sheets containing an inorganic oxide material powder are prepared, and the firing-assisting green sheet, the conductor green sheet, the dielectric green sheet, another conductor green sheet, and another firing-assisting green sheets are stacked in that order to prepare a laminate. The laminate is then fired. During firing, the bonding strength of the interfaces between the conductor green sheets and the firing-assisting green sheets is decreased and the oxygen partial pressure of the firing atmosphere is changed at least once so that the capacitor portion is separated from the firing-assisting green sheets. In this manner, a method for manufacturing thin film capacitor by which a high-reliability thin film capacitor can be produced at high efficiency and low cost without adversely affecting the characteristics of the thin film capacitor.

12 Claims, 3 Drawing Sheets

U.S. PATENT DOCUMENTS

| | | | |
|---|---|---|---|
| 5,405,466 A | 4/1995 | Naito et al. | |
| 5,470,412 A * | 11/1995 | Fukuta et al. | 156/89.15 |
| 2004/0065986 A1 * | 4/2004 | Otsuka | 264/614 |
| 2005/0095851 A1 * | 5/2005 | Watanabe et al. | 438/663 |

FOREIGN PATENT DOCUMENTS

| | | |
|---|---|---|
| JP | 08-078283 | 3/1996 |
| JP | 09-249460 | 9/1997 |
| JP | 10095677 A * | 4/1998 |
| JP | 2002-050869 | 2/2002 |
| JP | 2003-238259 | 8/2003 |
| JP | 2004-304113 | 10/2004 |
| JP | 2004323306 A * | 11/2004 |

OTHER PUBLICATIONS

Written Opinion PCT/JP2006/308563 dated Jul. 10, 2006.

* cited by examiner

METHOD FOR MANUFACTURING THIN FILM CAPACITOR

CROSS REFERENCE TO RELATED APPLICATIONS

The present application is a continuation of International Application No. PCT/JP2006/308563, filed Apr. 24, 2006, which claims priority to Japanese Patent Application No. JP2005-137187, filed May 10, 2005, and Japanese Patent Application No. JP2005-206942, filed Jul. 15, 2005, the entire contents of each of these applications being incorporated herein by reference in their entirety.

FIELD OF THE INVENTION

The present invention relates to a method for manufacturing a thin film capacitor for use in an electronic circuit.

BACKGROUND OF THE INVENTION

According to the existing art, a thin film capacitor for use in an electronic circuit is made by sequentially depositing a lower conductor, a dielectric thin film, and an upper conductor on a silicon (Si) substrate. When a thin film capacitor is made by such a method, the thickness of the capacitor cannot be reduced to the thickness or less of the Si substrate, which does not contribute to capacitance. Thus, in order to promote further size and thickness reduction, a structure and a production method that do not require a substrate must be realized.

For example, patent document 1 proposes a thin film capacitor including a metal foil, an inorganic dielectric thin film deposited on the metal foil, and a metal body formed on the inorganic dielectric thin film.

According to patent document 1, the dielectric thin film and the metal body can be sequentially deposited on the metal foil by a vacuum process such as RF magnetron sputtering or vacuum deposition. Thus, there is no need to provide a substrate, such as a Si substrate, for deposition, thereby enabling size and thickness reduction of the thin film capacitor.

Patent document 2 proposes a method for making a ceramic multilayer substrate including the steps of press-bonding, on both sides of a green compact formed from a plurality of green sheets with conductor patterns, dummy green sheets having a sintering temperature higher than that of the green sheets, firing the green compact and the dummy green sheets, and removing the dummy green sheets on the two sides of the resulting sintered compact. Patent document 2, however, does not relate to the technical field of the thin film capacitors.

Patent document 2 describes an alumina green sheet as the dummy green sheet having a sintering temperature higher than that of the green sheet.

Patent document 1: Japanese Unexamined Patent Application Publication No. 8-78283
Patent document 2: Japanese Unexamined Patent Application Publication No. 9-249460

Patent document 1, however, described that, from the standpoint of simplifying the production process, it is preferable to use a vacuum process as the method for depositing the dielectric thin film or the metal body.

However, the vacuum process requires high process cost and high material cost for the metal foil. Thus, the production cost can increase sharply.

One conceivable method for reducing the production cost is to make a thin film capacitor by press-bonding conductor green sheets, which form conductor layers, on both main surfaces of a dielectric green sheet, which forms a dielectric layer to prepare a laminate, and firing the laminate.

However, since the capacitor portion formed from the dielectric green sheet and the conductor green sheets is usually a thin film of 100 μm or less in thickness, the capacitor portion would undergo warpage or undulation by thermal shrinking occurring during firing.

One possible method for preventing such warpage and undulation is a method described in patent document 2 of press-bonding alumina green sheets functioning as dummy green sheets on both sides of a laminate. In such a case, however, since alumina contained in the dummy green sheets adheres on the conductor green sheet during firing, it is necessary to remove alumina by conducting polishing or the like after the firing.

However, since the thickness of the thin film capacitor is 100 μm or less, the dielectric layer may be damaged and the electrical shorting may occur between conductor layers by polishing or the like. Moreover, damage on the dielectric layer caused by polishing severely increases as the thickness of the dielectric layer is reduced. This poses a serious impediment to reducing the size of and increasing the capacitance of the thin-film capacitor.

In order to prevent adhesion of alumina on the conductor green sheets, the particle size of alumina may be increased. However, this will cause a new problem, i.e., an increase in surface roughness of the main surfaces of the conductor green sheets.

Thus, it is difficult to obtain a thin film capacitor at low cost without imparting adverse effects to the dielectric layer by applying the method for making the ceramic multilayer substrate set forth in patent document 2 to the thin film capacitor.

SUMMARY OF THE INVENTION

The present invention has been made on the basis of the above-described situations. An object of the present invention is to provide a method for manufacturing a thin film capacitor at low cost and high efficiency without adversely affecting the dielectric layer.

In order to achieve the above-described object, a method for manufacturing a thin film capacitor having a dielectric layer and conductor layers on both main surfaces of the dielectric layer, the method includes a green sheet preparation step of preparing a dielectric green sheet containing a dielectric ceramic powder, conductor green sheets containing a metal powder, and firing-assisting green sheets containing an inorganic oxide material powder; a laminate preparation step of respectively disposing the conductor green sheets on both main surfaces of the dielectric green sheet to form a capacitor portion and disposing firing-assisting green sheets so that the capacitor portion is held between the firing-assisting green sheets to thereby prepare a laminate; and a firing step of firing the laminate, in which, during firing in the firing step, a bonding strength of interfaces between the conductor green sheets and the firing-assisting green sheets is decreased and an oxygen partial pressure of a firing atmosphere is changed at least once so that the thin film capacitor, which is a sinter of the capacitor portion, is separated from firing-assisting members, which are sinters of the firing-assisting green sheets.

The meaning of the phrase "thin film capacitor is separated from firing-assisting members" includes the case in which the conductor layers of the thin film capacitor are completely separated from the firing-assisting members and the case in which the firing-assisting members are attached to the conductor layers with a significantly low bonding force (i.e., are substantially separated from the conductor layers, such that they extremely easily separate from the conductor layers by light contact with a jig or the like).

The meaning of the phrase "oxygen partial pressure is changed at least once" includes the case in which the oxygen partial pressure in the reducing or neutral atmosphere undergoes minor changes in relation to the equilibrium oxygen partial pressure for the redox reaction of the metal, which is the main component of the inner electrodes. Preferably, the oxygen partial pressure is significantly changed such as changing a reducing atmosphere to a neutral atmosphere or changing a neutral atmosphere to a reducing atmosphere.

In the method for manufacturing the thin film capacitor of the present invention, the metal powder is Ni or an alloy mainly composed of Ni.

In the method for manufacturing the thin film capacitor of the present invention, the firing-assisting green sheets are formed to have a frame shape and arranged such that outer peripheries of the firing-assisting green sheets are in contact with or near outer peripheries of the conductor green sheets.

In the method for manufacturing the thin film capacitor of the present invention, the inorganic oxide material powder is an $Al_2O_3$ powder.

In the method for manufacturing the thin film capacitor of the present invention, a total of a thickness of the dielectric layer and a thickness of the conductor layers is 100 μm or less.

As described above, the method for manufacturing the thin film capacitor described above includes a green sheet preparation step of preparing a dielectric green sheet containing a dielectric ceramic powder, conductor green sheets containing a metal powder, and firing-assisting green sheets containing an inorganic oxide material powder; a laminate preparation step of respectively disposing the conductor green sheets on both main surfaces of the dielectric green sheet to form a capacitor portion and disposing firing-assisting green sheets so that the capacitor portion is held between the firing-assisting green sheets to thereby prepare a laminate; and a firing step of firing the laminate, in which, during firing in the firing step, a bonding strength of interfaces between the conductor green sheets and the firing-assisting green sheets is decreased and an oxygen partial pressure of a firing atmosphere is changed at least once so that the thin film capacitor, which is a sinter of the capacitor portion, is separated from firing-assisting members, which are sinters of the firing-assisting green sheets. Accordingly, the firing-assisting green sheets can suppress warpage and undulation in the thin film capacitor, which is the sinter of the capacitor portion. Moreover, since the thin film capacitor is separated from the firing-assisting members by decreasing the bonding strength of the interfaces between the conductor green sheet and the firing-assisting green sheets and changing the oxygen partial pressure of the firing atmosphere at least once, mechanical processing such as polishing is not necessary, the thin film capacitor is prevented from being damaged, and electrical shorting between the conductor layers is prevented.

The metal powder is either Ni or an alloy mainly composed of Ni and uses relatively inexpensive Ni with a high melting point (mp: 1455° C.) as the main conductive component. Thus, the metal powder can withstand a firing temperature of 1000° C. or higher and a thin film capacitor including a dielectric layer with a high dielectric constant can be obtained.

By rendering the firing-assisting green sheets in a frame shape and arranging the firing-assisting green sheets such that the outer peripheries thereof are in contact or near the outer peripheries of the conductor green sheets, part of the conductor green sheets is directly exposed to the atmosphere in the furnace. Thus, the controllability of the firing atmosphere relative to the capacitor portion can be improved.

When the inorganic oxide material is an $Al_2O_3$ powder which is relatively inexpensive and highly available, the characteristics of the capacitor are rarely affected even when part of the powder diffuses into the conductor green sheets or the dielectric green sheet. Thus, a thin film capacitor with excellent characteristics can be easily made at low cost.

Since the total thickness of the dielectric layer and the conductor layers is 100 μm or less, a desired thin film capacitor with no adverse effects on the dielectric layer can be produced at high efficiency and low cost.

Figure 1:
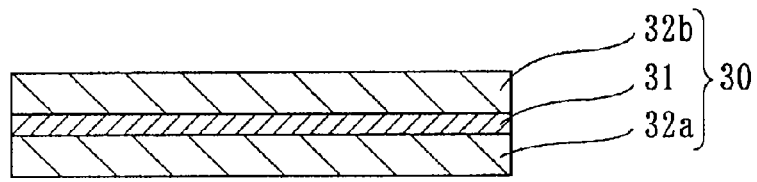
FIG. 1 is a cross-sectional view schematically showing one embodiment of a thin film capacitor made by a production method of the present invention.

REFERENCE NUMERALS 1 dielectric green sheet
2a, 2b conductor green sheet
10 capacitor portion
20a, 20b firing-assisting green sheet
21a, 21b firing-assisting member
30 thin film capacitor
31 dielectric layer
32a, 32b conductor layer
50 laminate
51 laminate

DETAILED DESCRIPTION OF THE INVENTION

The embodiments of the present invention will now be described in detail.

FIG. 1 is a cross-sectional view showing an embodiment of a thin film capacitor made by the production method of the present invention. A thin film capacitor 30 includes a dielectric layer 31 mainly composed of a dielectric ceramic material and conductor layers 32a and 32b respectively disposed on two main surfaces of the dielectric layer 31. That is, the dielectric layer 31 is held between pairing upper and lower conductor layers 32a and 32b, and the total thickness of these thin films, i.e., the total thickness of the thin film capacitor 30, is designed to be 100 μm or less.

The method for manufacturing this thin film capacitor will now be described in detail.

Figure 2:
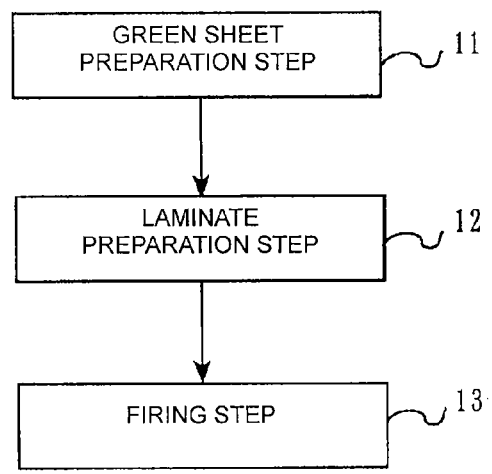
FIG. 2 is a process flowchart showing an embodiment of the method for manufacturing a thin film capacitor according to the present invention.

FIG. 2 is a process flowchart showing an embodiment (first embodiment) of the method for manufacturing a thin film capacitor according to the present invention.

In a green sheet preparation step 11, a dielectric green sheet, conductor green sheets, and firing-assisting green sheets are prepared.

In particular, a dielectric ceramic powder and an organic binder such as polyvinyl butyral resin or the like are mixed and dispersed in an organic solvent such as toluene, ethanol, or the like to prepare a dielectric ceramic slurry. Subsequently, the dielectric ceramic slurry is shaped by a doctor blade technique or the like to form a dielectric green sheet having a thickness of 0.5 to 10 µm. Note that although a ferroelectric material that can yield a high dielectric constant when formed into a dielectric layer is preferred as the dielectric ceramic powder, a paraelectric material may be used as the dielectric ceramic powder instead. In particular, metal oxides having a perovskite structure, such as $(Ba, Ca) TiO_3$, $BaTiO_3$, $SrTiO_3$, $(Ba, Sr) TiO_3$, and $Pb(Zr, Ti) O_3$ are preferred for use.

Next, a metal powder having an average diameter of 0.2 to 1.5 µm and an organic binder such as polyvinyl butyral resin are mixed and dispersed in an organic solvent such as toluene or ethanol to prepare a conductor slurry. The conductor ceramic slurry was shaped by a doctor blade technique or the like into conductor green sheets each having a thickness of 1.0 to 10 µm.

In this embodiment, it is considered possible to separate the conductor green sheets (conductor layers) from the firing-assisting green sheets (firing-assisting members) by utilizing redox reaction of the metal constituting the conductor layers, as described below. Thus, a metal that can be oxidized and reduced by heat treatment, such as Ni, Cu, or an alloy containing Ni or Cu as the main component, can be used as the metal powder material. In particular, Ni or an alloy containing Ni as the main component withstands a firing temperature of 1000° C. or higher, which is a temperature desirable for obtaining a dielectric layer with a high dielectric constant, since the melting point of Ni is as high as 1455° C. Moreover, Ni or an alloy containing Ni as the main component is relatively inexpensive and thus preferred. Metal hardly oxidizable by firing, such as Au, is not preferred.

Next, an inorganic oxide material and an organic binder such as polyvinyl butyral resin are mixed and dispersed in an organic solvent such as toluene or ethanol to prepare a conductor slurry. Subsequently, the conductor slurry was shaped by a shaping method such as a doctor blade technique to prepare firing-assisting green sheets.

Note that the thickness of the firing-assisting green sheets is not particularly limited as long as warpage and undulation in the thin film capacitor by firing is suppressed. The thickness is preferably 25 to 500 µm from the viewpoint of production cost and the like.

An oxide that does not sinter at the sintering temperature of the dielectric layer is preferably used as the inorganic oxide material. For example, $Al_2O_3$, $ZrO_2$, $CeO_2$, and $ZnO$ can be used. Among these, $Al_2O_3$ is particularly preferable since it is relatively inexpensive and rarely affects the characteristics of the thin film capacitor even when it partly diffuses into the conductor green sheets or the dielectric green sheet during firing.

The inorganic oxide material preferably has as small average particle diameter as possible since the surface roughness of the conductor layers is affected by the particle diameter of the inorganic oxide material. In particular, the average particle diameter is preferably 2.0 µm or less.

It is also preferable to add additives such as an antifoaming agent and a plasticizer according to need during the process of preparing the green sheets.

After the dielectric green sheet, the conductor green sheets, and the firing-assisting green sheets are prepared in green sheet preparation step 11, a laminate preparation step 12 is conducted.

Figure 3:
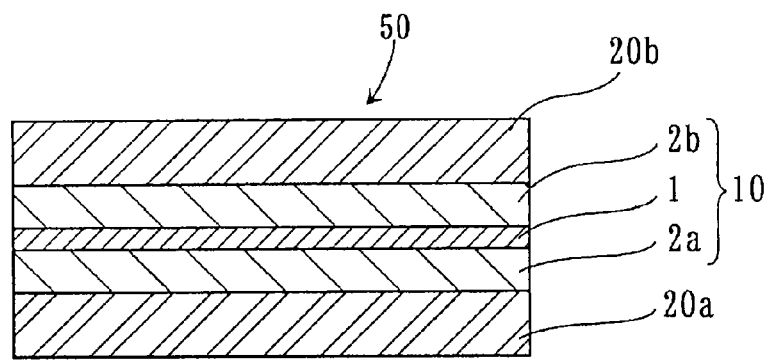
FIG. 3 is a cross-sectional view of a laminate for explaining an embodiment of a laminate preparation step.

In the laminate preparation step 12, as shown in FIG. 3, a firing-assisting green sheet 20a, a conductor green sheet 2a, a dielectric green sheet 1, a conductor green sheet 2b, and a firing-assisting green sheet 20b are sequentially stacked and press-bonded by applying a pressure at a predetermined temperature for a predetermined time to thereby form a laminate 50. In this manner, a capacitor portion 10 including the dielectric green sheet 1 and the conductor green sheets 2a and 2b on both main surfaces of the dielectric green sheet 1 is formed. The laminate 50 includes the capacitor portion 10 and the firing-assisting green sheets 20a and 20b respectively disposed on the upper surface and the lower surface of the capacitor portion 10.

Next, after the laminate 50 is prepared as such, a firing step 13 is conducted.

In the firing step 13, the laminate 50 is first heat-treated at a temperature of 250° C. to 400° C. for a predetermined time in a nitrogen atmosphere to remove the binder.

Then the atmosphere is changed to a reducing atmosphere whose oxygen partial pressure is set to be lower than the equilibrium oxygen partial pressure, which is the standard of occurrence of the redox reaction of the metal. The laminate 50 is fired in the reducing atmosphere by retaining the laminate 50 at a maximum temperature of 1050° C. to 1300° C. for about 2 hours, and the oxygen partial pressure is then increased to the equilibrium oxygen partial pressure or near to yield a neutral atmosphere. The furnace is cooled in the neutral atmosphere to room temperature to end the firing process.

Figure 4:
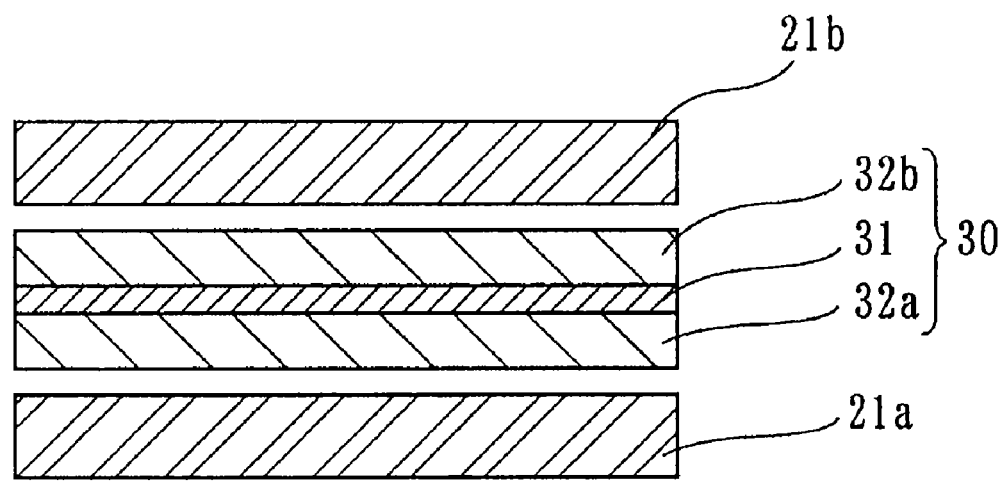
FIG. 4 is a cross-sectional view for explaining an embodiment of a firing step.

As a result, as shown in FIG. 4, the dielectric green sheet 1 sinters to form the dielectric layer 31, the conductor green sheets 2a and 2b sinter to form the conductor layers 32a and 32b, and the dielectric layer 31 and the conductor layers 32a and 32b form the thin film capacitor 30. The sintering-assisting green sheets 20a and 20b separate from the thin film capacitor 30 to become sintering-assisting members 21a and 21b.

The reasons why the sintering-assisting members 21a and 21b can be separated from the conductor layers 32a and 32b without requiring mechanical processing such as polishing are presumably as follows.

Since there is a relatively large difference in linear expansion coefficient between the metal powder and the inorganic oxide material, there is also a difference in amount of thermal shrinkage during cooling of the firing furnace in the firing step 13, thereby generating stresses at the interfaces between the firing-assisting green sheets 20a and 20b (firing-assisting members 21a and 21b) and the conductor green sheets 2a and 2b (conductor layers 32a and 32b). As the oxygen partial pressure is changed from the reducing atmosphere to the neutral atmosphere in the firing step 13, the oxidation state of the surface of the Ni powder in the conductor green sheets 2a and 2b changes, resulting in a change in volume. Due to this volume change, the stresses at the interfaces between the firing-assisting green sheets 20a and 20b (firing-assisting members 21a and 21b) and the conductor green sheets 2a and 2b (conductor layers 32a and 32b) increase further. That is, the stresses at the interfaces caused by the difference in linear expansion coefficient and the stresses caused the change in oxidation state of the metal powder surface significantly decrease the bonding strength of the interfaces between the firing-assisting green sheets 20a and 20b (firing-assisting members 21a and 21b) and the conductor green sheets 2a and 2b (conductor layers 32a and 32b), and the firing-assisting members 21a and 21b can be easily separated from the conductor layers 32a and 32b without requiring mechanical processing.

In this embodiment, firing is conducted while holding the capacitor portion 10 between the sintering-assisting green sheets 20a and 20b containing $Al_2O_3$, and the oxygen partial pressure is changed during the sintering process from the reducing atmosphere to the neutral atmosphere. Thus, the firing-assisting members 21a and 21b obtained by sintering the firing-assisting green sheets 20a and 20b can be easily separated from the conductor layers 32a and 32b obtained by sintering the conductor green sheets 2a and 2b. Accordingly, a thin film capacitor is obtained in which no mechanical processing such as polishing is necessary to remove the firing-assisting members 21a and 21b from the capacitor portion 10, the dielectric layer 31 is prevented from being damaged, and electrical short circuiting between the conductor layers 32a and 32b can be prevented. Moreover, since the firing-assisting green sheets 20a and 20b hold the capacitor portion 10, warpage or undulation of the thin film capacitor 30 after the firing can be suppressed.

Since the total thickness of the dielectric layer and the conductor layers is 100 μm or less, a thin film capacitor having excellent characteristics and high reliability and free of mechanical damage can be obtained.

In the case where mechanical processing such as polishing is conducted after the firing step 13, the degradation of mechanical and electrical properties becomes more severe as the thickness of the dielectric layer 31 is reduced. However, since mechanical processing is not necessary in this embodiment, the dielectric layer 31 can be made thin. That is, since the capacitance of the thin film capacitor 30 is inversely proportional to the thickness of the dielectric layer 31, the thickness of the dielectric layer 31 is preferably 10 μm or less to achieve a high capacitance. In this embodiment, since mechanical processing such as polishing is not necessary, the thickness of the dielectric layer 31 can be reduced to 1 μm or less.

Figure 5:
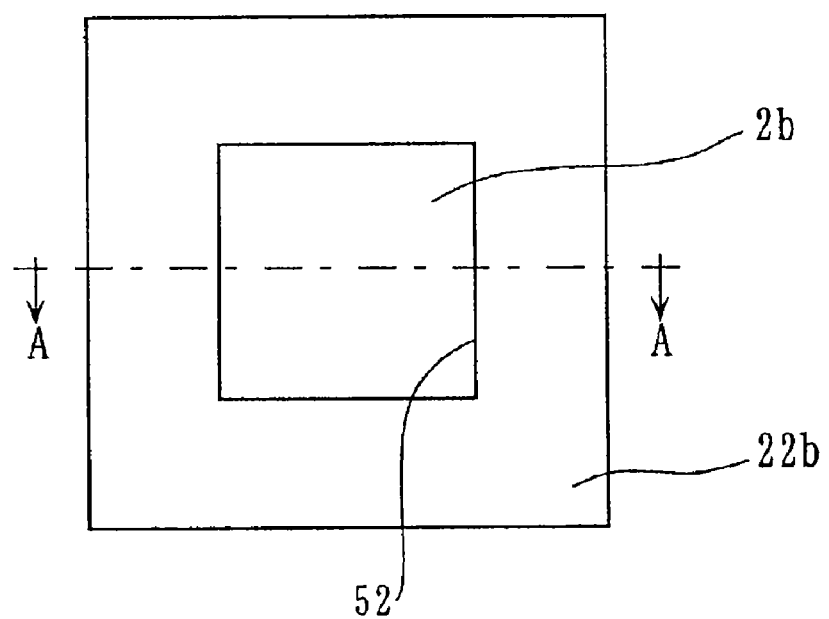
FIG. 5 is a plan view of a related part of a second embodiment of a method for manufacturing a thin film capacitor of the present invention.
Figure 6:
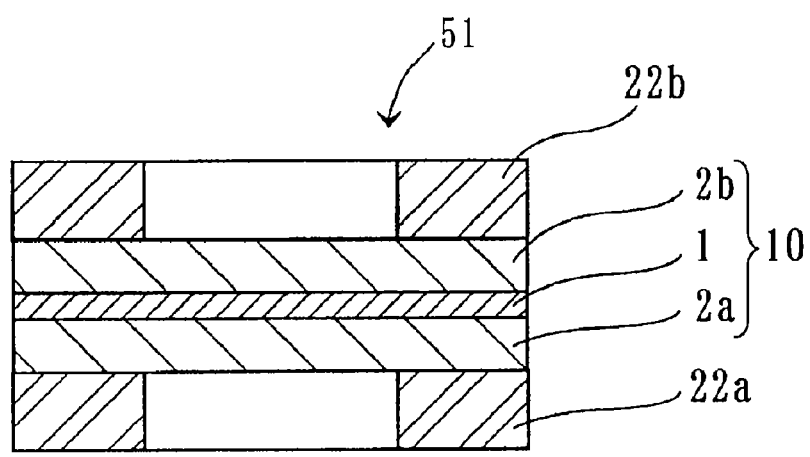
FIG. 6 is a cross-sectional view taken along line A-A in FIG. 5.

FIG. 5 is a plan view showing a relevant part of a second embodiment of the method for manufacturing the thin film capacitor according to the present invention, and FIG. 6 is a A-A cross-sectional view.

In the second embodiment, firing-assisting green sheets 22a and 22b are each frame-shaped and each have a hole 52 in the central portion. The firing-assisting green sheets 22a and 22b are respectively disposed on an upper surface of the conductor green sheet 2a and the a lower surface of the conductor green sheet 2b so that the firing-assisting green sheets 22a and 22b contact with the outer peripheries of the conductor green sheets 2a and 2b, respectively. The firing-assisting green sheets 22a and 22b and the capacitor portion 10 constitute a laminate 51.

When the laminate 51 is fired, part of the conductor green sheets 2a and 2b is directly exposed to the atmosphere in the firing furnace. Thus, atmosphere controllability relative to the capacitor portion 10 can be enhanced. Since the firing-assisting green sheets 22a and 22b restrain the outer peripheries of the conductor green sheets 2a and 2b, in-plane shrinkage of the capacitor portion 10 during firing can be suppressed and warpage and undulation can be prevented as in the first embodiment.

In the second embodiment described above, the firing-assisting green sheets 22a and 22b are arranged such that the outer peripheries of the firing-assisting green sheets 22a and 22b completely align with the outer peripheries of the conductor green sheets 2a and 2b. However, the outer peripheries of the firing-assisting green sheets 22a and 22b do not have to completely align with the outer peripheries of the conductor green sheets 2a and 2b. The firing-assisting green sheets 22a and 22b may be arranged by being slightly displaced from the outer peripheries of the conductor green sheets 2 as long as the warpage and undulation of the capacitor portion 10 can be sufficiently suppressed.

In the second embodiment, the firing-assisting green sheets 22a and 22b are frame-shaped in both outer peripheries and inner peripheries. Alternatively, the outer and inner peripheries may be circular or elliptic in shape, or the outer periphery may be shaped differently from the inner periphery, e.g., a rectangular outer periphery and a circular inner periphery may be provided. The holes of the firing-assisting green sheets 22a and 22b may be formed as grids.

In the second embodiment, since the portions of the conductor green sheets 2a and 2b that do not contact the firing-assisting green sheets 22a and 22b are directly exposed to the firing atmosphere and the portions of the conductor green sheets 2a and 2b that contact the firing-assisting green sheets 22a and 22b are not directly exposed to the firing atmosphere, a difference in characteristics of the thin film capacitor may be generated between these portions. In such a case, the portions of the conductor green sheets 2a and 2b that do not contact the firing-assisting green sheets 22a and 22b may be separated by cutting with a dicing saw or the like from the portions of the conductor green sheets 2a and 2b that contact the firing-assisting green sheets 22a and 22b so that one of these portions can be used as the product.

In the first embodiment, depending on the selection of the material, the inorganic oxide material in the firing-assisting green sheets 21a and 21b may diffuse into the conductor green sheets 2a and 2b and the dielectric green sheet 1 and may thereby degrade the characteristics of the thin film capacitor. However, in the second embodiment, since the firing-assisting green sheets 22a and 22b are frame-shaped, in the portions of the conductor green sheets 2a and 2b that do not contact the firing-assisting green sheets 22a and 22b, the inorganic oxide material does not diffuse into the conductor green sheets 2a and 2b or the dielectric green sheet 1. Thus, by separating, such as by cutting with a dicing saw or the like, the portions of the conductor green sheets 2a and 2b that do not contact the firing-assisting green sheets 22a and 22b, so that these portions only can be used as the products, a thin film capacitor having the desired characteristics can be obtained.

The present invention is not limited by the embodiments described above and allows various modifications and alterations without departing from the scope of the invention. In the embodiments described above, the firing atmosphere is changed from a reducing atmosphere to a neutral atmosphere in relation to the equilibrium oxygen partial pressure for the redox reaction of the metal powder, the firing atmosphere is not limited to this. For example, it is also preferable to adequately change the firing atmosphere to change the oxidization state of the surface of the metal powder, such as changing from a reducing atmosphere to a neutral atmosphere and then to an oxidizing atmosphere or from a reducing atmosphere to a neutral atmosphere and then to a reducing atmosphere.

In the embodiments described above, the thin film capacitor has conductor layers entirely covering both main surfaces of the dielectric layers. Alternatively, the conductor layers may cover only part of the main surfaces of the dielectric layer. In such a case, part of the conductor layers may be removed by etching or the like after firing.

In order to increase the mechanical strength or improve moisture resistance, a resin layer covering at least part of the conductor layer may be formed after firing.

Example and Comparative Example of the present invention will now be specifically described.

EXAMPLE

(1) Green Sheet Preparation Step

A dielectric ceramic powder mainly composed of (Ba, Ca)TiO$_3$ and having an average particle diameter of 0.2 μm and an organic binder mainly composed of polyvinyl butyral resin were mixed and dispersed in an organic solvent containing toluene and ethanol at a volume ratio of 1:1 to prepare a dielectric ceramic slurry. The volume ratio of the dielectric ceramic powder to the organic binder to the organic solvent was 10:10:80. The volume of the dielectric ceramic powder was determined by measuring the weight of the dielectric ceramic powder and dividing the weight by its theoretical density. The dielectric ceramic slurry was formed into a sheet by a doctor blade technique to obtain a dielectric green sheet having a thickness of 2 μm.

A Ni powder, serving as the metal powder, having an average particle diameter of 0.5 μm and an organic binder mainly composed of polyvinyl butyral resin were mixed and dispersed in an organic solvent containing toluene and ethanol at a volume ratio of 1:1 to prepare a conductor slurry. The volume ratio of the Ni powder, the organic binder, and the organic solvent was 10:10:80. The volume of the Ni powder was determined by measuring the weight of the Ni powder and dividing the weight by its theoretical density. The conductor slurry was formed into sheets by a doctor blade technique to obtain conductor green sheets having a thickness of 9 μm.

An Al$_2$O$_3$ powder having an average particle diameter of 1.0 μm was prepared as the inorganic oxide material, and the Al$_2$O$_3$ powder and an organic binder mainly composed of polyvinyl butyral resin were mixed and dispersed in an organic solvent containing toluene and ethanol at a volume ratio of 1:1 to prepare a firing-assisting ceramic slurry. The volume ratio of the Al$_2$O$_3$ powder to the organic binder to the organic solvent was 10:10:80. The volume of the Al$_2$O$_3$ powder was determined by measuring the weight of the Al$_2$O$_3$ powder and dividing the weight by its theoretical density. The firing-assisting ceramic slurry was formed into sheets by a doctor blade technique to obtain firing-assisting green sheets having a thickness of 100 μm.

(2) Laminate Preparation Step

A firing-assisting green sheet, a conductor green sheet, a dielectric green sheet, another conductor green sheet, and another firing-assisting green sheet were sequentially stacked and press-bonded at a temperature of 50° C. and a pressure of 100 MPa for 30 seconds to prepare a laminate.

(3) Firing Step

The resulting laminate was heat-treated at 280° C. in a nitrogen atmosphere for 5 hours to remove the binder. The oxygen partial pressure was then set to a level lower than the equilibrium oxygen partial pressure of the Ni powder to yield a reducing atmosphere, and the laminate was held at 1150° C. for 2 hours in the reducing atmosphere to conduct firing. Subsequently, the oxygen partial pressure was increase to the equilibrium oxygen partial pressure or near to yield a neutral atmosphere. The firing furnace was cooled to room temperature in the neutral atmosphere to end the firing step.

During the firing, the firing-assisting green sheets became plate-shaped firing-assisting members by evaporation and disappearance of the organic substances such as the organic binder and the organic solvent. The firing-assisting members separated from the thin film capacitor without requiring mechanical processing such as polishing, and a thin film capacitor having conductor layers disposed on both main surfaces of a dielectric layer was obtained thereby.

The thin film capacitor had a total thickness of 13 μm. The shrinkage in the in-plane direction measured with an optical length-measuring instrument was 1% or less and no warpage or undulation was observed. The surface roughness Ra of the conductor layers measured with an atomic force microscope was about 200 nm. Thus, it was confirmed that the flatness was satisfactory. It was also confirmed that the in-plane distribution of dielectric constant measured with an LCR meter was suppressed to 3% or less.

COMPARATIVE EXAMPLE

A laminate prepared by the same method and process as EXAMPLE was heat-treated at 280° C. in a nitrogen atmosphere for 5 hours to remove the binder. As in EXAMPLE, the oxygen partial pressure was controlled to yield the same reducing atmosphere as in EXAMPLE, and the laminate was retained at 1150° C. for 2 hours in the reducing atmosphere to conduct firing. The firing furnace was then cooled to room temperature in the same firing atmosphere, i.e., the reducing atmosphere, to end the firing step.

In the resulting sinter, Al$_2$O$_3$ contained in firing-assisting green sheets adhered on the conductor layers of the thin film capacitor and could not be easily removed. Al$_2$O$_3$ was removed by polishing, but the dielectric layer was damaged and the conductors of the thin film capacitor were electrically shorted.

In COMPARATIVE EXAMPLE, the oxygen partial pressure was not changed during the firing step and firing was conducted in a reducing atmosphere at a constant oxygen partial pressure. Thus, sufficient stresses were not generated at the interfaces between the conductor green sheets and the firing-assisting green sheets, and the capacitor portion could not be separated from the sintering-assisting members.

The invention claimed is:

1. A method for manufacturing a thin film capacitor having a dielectric layer and conductor layers on both main surfaces of the dielectric layer, the method comprising:
    preparing a dielectric green sheet containing a dielectric ceramic powder;
    preparing conductor green sheets containing a metal powder;
    preparing firing-assisting green sheets containing an inorganic oxide material powder;
    preparing a laminate by respectively disposing the conductor green sheets on surfaces of the dielectric green sheet to form a capacitor portion and disposing the firing-assisting green sheets so that the capacitor portion is held between the firing-assisting green sheets; and
    firing the laminate by changing an oxygen partial pressure of a firing atmosphere at least once so that the capacitor portion and the firing-assisting green sheets are both sintered and separated from each other.

2. The method for manufacturing the thin film capacitor according to claim 1, wherein the laminate is fired such that a bonding strength at interfaces between the conductor green sheets and the firing-assisting green sheets is decreased.

3. The method for manufacturing the thin film capacitor according to claim 1, wherein the firing step includes:
    heat-treating the laminate in a nitrogen atmosphere;
    changing the atmosphere to a reducing atmosphere; and
    firing the laminate in the reducing atmosphere.

4. The method for manufacturing the thin film capacitor according to claim 3, wherein the heat-treating is carried out at a temperature of 250° C. to 400° C.

5. The method for manufacturing the thin film capacitor according to claim 3, wherein the reducing atmosphere has an oxygen partial pressure lower than an equilibrium oxygen partial pressure.

6. The method for manufacturing the thin film capacitor according to claim 3, wherein the laminate is fired in the reducing atmosphere at a temperature of 1050° C. to 1300° C.

7. The method for manufacturing the thin film capacitor according to claim 3, wherein the firing step further includes:
   changing the reducing atmosphere to a neutral atmosphere; and
   cooling the laminate in the neutral atmosphere.

8. The method for manufacturing the thin film capacitor according to claim 1, wherein the metal powder is Ni or an alloy mainly composed of Ni.

9. The method for manufacturing the thin film capacitor according to claim 1, wherein the firing-assisting green sheets are formed in a frame shape and arranged such that outer peripheries of the firing-assisting green sheets are in contact with or near outer peripheries of the conductor green sheets.

10. The method for manufacturing the thin film capacitor according to claim 1, wherein the inorganic oxide material powder is an $Al_2O_3$ powder.

11. The method for manufacturing the thin film capacitor according to claim 1, wherein the inorganic oxide material powder has an average particle diameter of 2.0 μm or less.

12. The method for manufacturing the thin film capacitor according to claim 1, wherein a total of a thickness of the dielectric layer and a thickness of the conductor layers is 100 μm or less.

* * * * *